Feb. 20, 1968 G. M. CRAIG 3,369,361
GAS TURBINE POWER PLANT WITH SUB-ATMOSPHERIC SPRAY-COOLED
TURBINE DISCHARGE INTO EXHAUST COMPRESSOR
Filed March 7, 1966 2 Sheets-Sheet 1

INVENTOR.
Gale M. Craig
BY
Lockwood, Woodard, Smith & Weikart
Attorneys

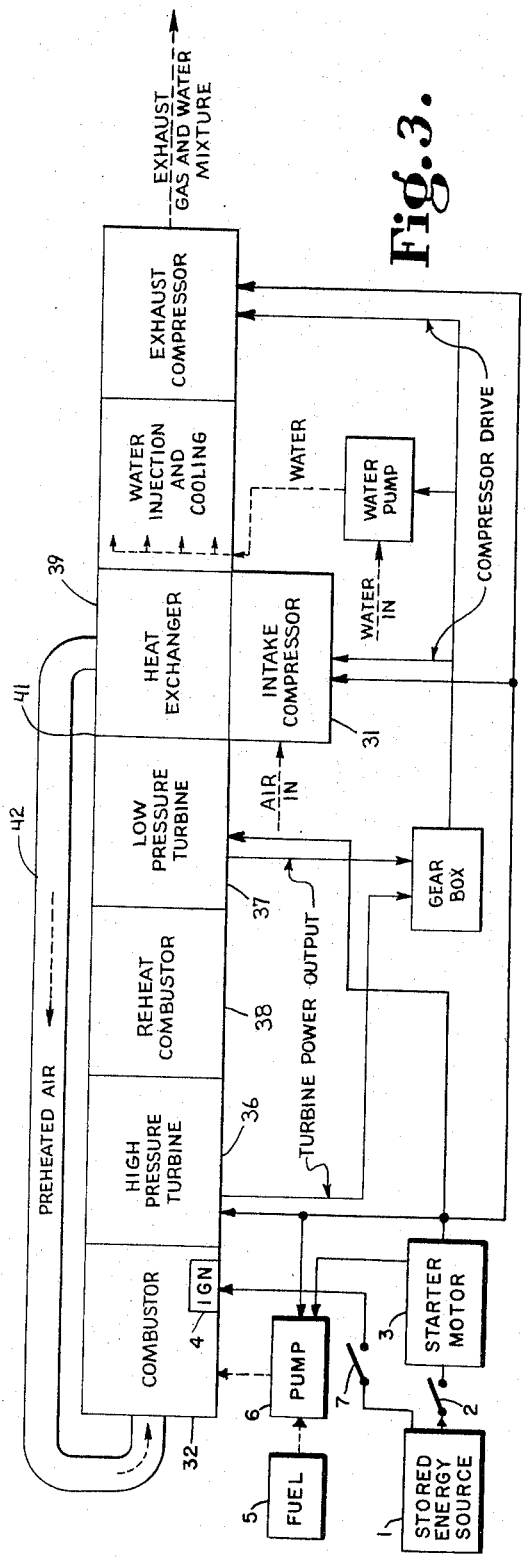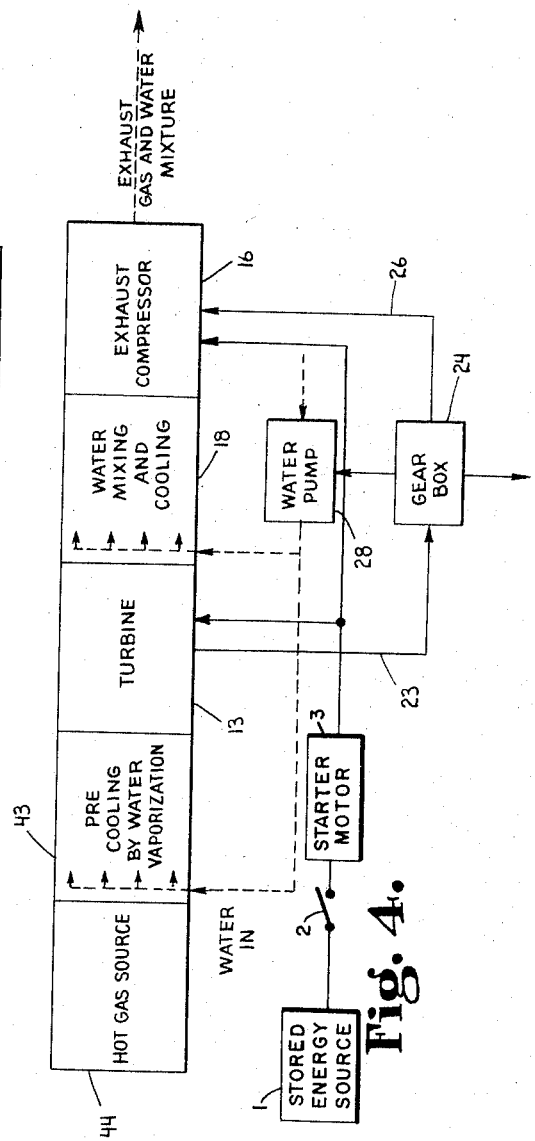

United States Patent Office 3,369,361
Patented Feb. 20, 1968

3,369,361
GAS TURBINE POWER PLANT WITH SUB-ATMOSPHERIC SPRAY-COOLED TURBINE DISCHARGE INTO EXHAUST COMPRESSOR
Gale M. Craig, 2906 Walton St., Anderson, Ind. 46011
Continuation-in-part of application Ser. No. 346,246, Feb. 20, 1964. This application Mar. 7, 1966, Ser. No. 540,130
2 Claims. (Cl. 60—39.5)

ABSTRACT OF THE DISCLOSURE

Gas turbine power plant including intake compressor, combustor, gas turbine, water spray injection into turbine discharge gases for direct-contact mixing and cooling, with compression thereof from sub-atmospheric pressure to atmospheric pressure exhaust of the mixture of injected water and gases.

---

This invention relates generally to power plants incorporating gas turbines, and more particularly to a power plant in which hot gases are expanded from a pressure near atmospheric pressure to a pressure substantially below atmospheric pressure, and then condensed, and compressed back to atmospheric pressure.

This application is a continuation-in-part of my copending application Ser. No. 346,246, filed Feb. 20, 1964 and entitled, Gas Turbine Power Plant, and now abandoned.

It is well known that one of the disadvantages of presently known gas turbine power plants is inefficiency. Another problem is the requirement of materials which will not only withstand high pressures but also high pressures at high temperatures, particularly in gases and combustion products which tend to be corrosive. Efforts to overcome these problems usually result in solutions involving considerable cost penalties, so that efficient power plants remain unavailable to the general public.

It is therefore a general object of the present invention to provide a more efficient and inexpensive power plant incorporating a gas turbine.

A further object is to provide a power plant which employs materials under less severe working conditions than are typically found in conventional gas turbines.

Described briefly, in one embodiment of the present invention, a low performance intake compressor is connected to a combustor wherein hot gases are derived from combustion at about one and one-half times atmospheric pressure. These gases are expanded through a turbine to a pressure substantially below atmospheric pressure achieved by use of an "exhaust compressor." The hot gases at the low pressure are mixed with water, which results in reduction of volume, and condensation. The resulting mixture at a pressure well below atmospheric pressure, is then compressed to atmospheric pressure and discharged to atmosphere.

The full nature of the invention will be understood from the accompanying drawings and the following description and claims.

FIGURE 3 is a block diagram indicating another embodiment of the present invention.

FIGURE 4 is a block diagram of a further embodiment adapted to employment of a hot gas source which produces gases at a temperature above the metallurgical limits of the turbine.

Figure 1:
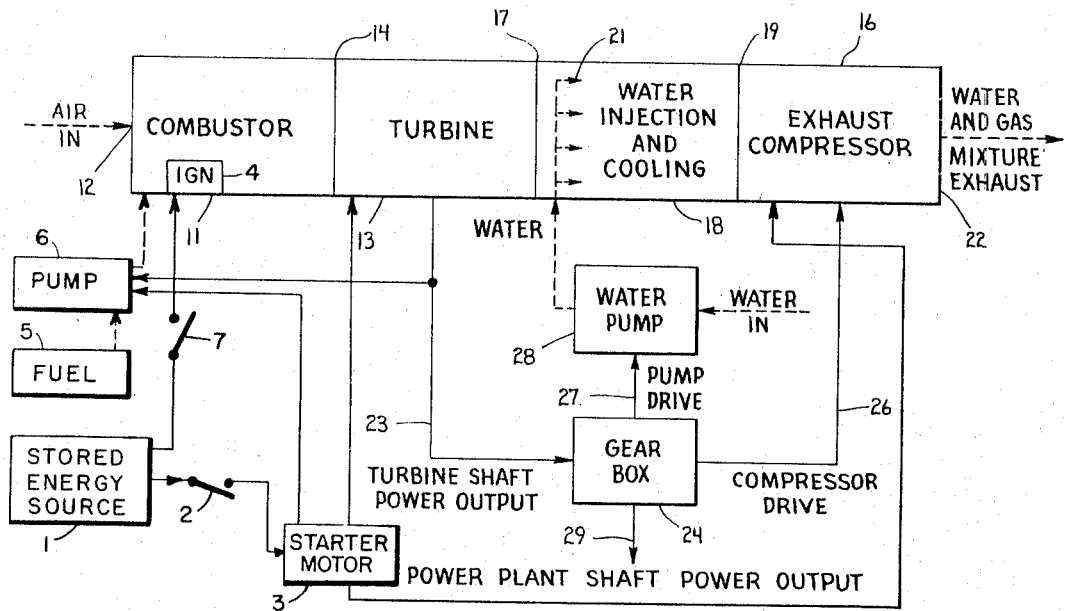
FIGURE 1 is a block diagram of an embodiment of the present invention dispensing with an intake compressor.

While referring to the drawings in detail, it should be understood that the specific detailed design of the various components incorporated can employ techniques and devices which are presently well known in the gas turbine and power plant arts. Therefore, for the purposes of disclosure of the present invention, the block diagrams now to be described will suffice.

Referring first to FIGURE 1, a simplified embodiment of the invention includes a combustor 11, turbine 13, water injection and cooling means 18 and exhaust compressor 16. In order to start the power plant, a stored energy source 1 is connected through a start switch 2 to a starter motor 3 connected to the turbine and to the compressor drive so that when the start switch is closed, both the turbine and exhaust compressor are rotated. The stored energy source can typically be a battery or other source of electrical energy, or could be a source of air. However, for purposes of this description it can be assumed to be a source of electrical energy or a battery having another output to ignition means 4 in the combustor 11. A source of fuel 5 can be provided with a pump 6 to pump fuel therefrom into the combustor. Accordingly, once the start switch is closed, a flow of air into the combustor at 12 (as indicated by the direction of the arrow at that point) is induced and a flow out of the power plant at 22 from the exhaust compressor is produced. Therefore, by the time the ignition switch 7 is closed, everything is moving in the correct direction so that combustion products will not flow out the front end at 12, but will continue to go in the proper direction in a manner well known in the gas turbine art.

The air entering the combustor is combined with fuel for burning the fuel in the combustor and according to the embodiment of FIGURE 1, the combustion products produced in the combustor are received by the turbine 13 and the pressure of these gases at the turbine inlet need not be above atmospheric pressure but may be equal to or below atmospheric pressure.

An exhaust compressor 16 is provided in the fluid flow path behind the turbine 13 and establishes a pressure at the turbine outlet 17 substantially below atmospheric pressure. Consequently, the hot gases from the combustor expand through the turbine to a pressure well below atmospheric pressure, thereby producing power in the turbine. Water injection and cooling means 18 are provided between the turbine outlet 17 and exhaust compressor inlet 19. The water injection and cooling means spray water as by jets 21, for example, into the hot exhaust gases leaving the turbine, the spray being in the direction of flow of the gases from the turbine to the exhaust compressor. This results in rejection of heat from the gases to the water and substantially increases the density of gas flow into the exhaust compressor. The exhaust compressor compresses the mixture of water and combustion products thereby raising the pressure therein to atmospheric pressure at the exhaust compressor outlet 22 where the water and gas mixture are exhausted to atmosphere.

The turbine shaft power output is connected through the gear box 24 to provide the compressor drive shaft input 26 to the exhaust compressor. A direct shaft drive from the turbine to the compressor can be employed without the gear box, if desired. However, the gear box provides a convenient means of providing a pump drive at 27 to the water pump 28 which feeds water under pressure to the injection and cooling means 18. It also provides a convenient place to take the power plant output from the shaft 29.

Depending on the particular application of the invention, there may be a substantial kinetic energy in the outlet of the exhaust compressor, which can be employed for a jet effect where the power plant is to be used for propulsion.

Figure 2:
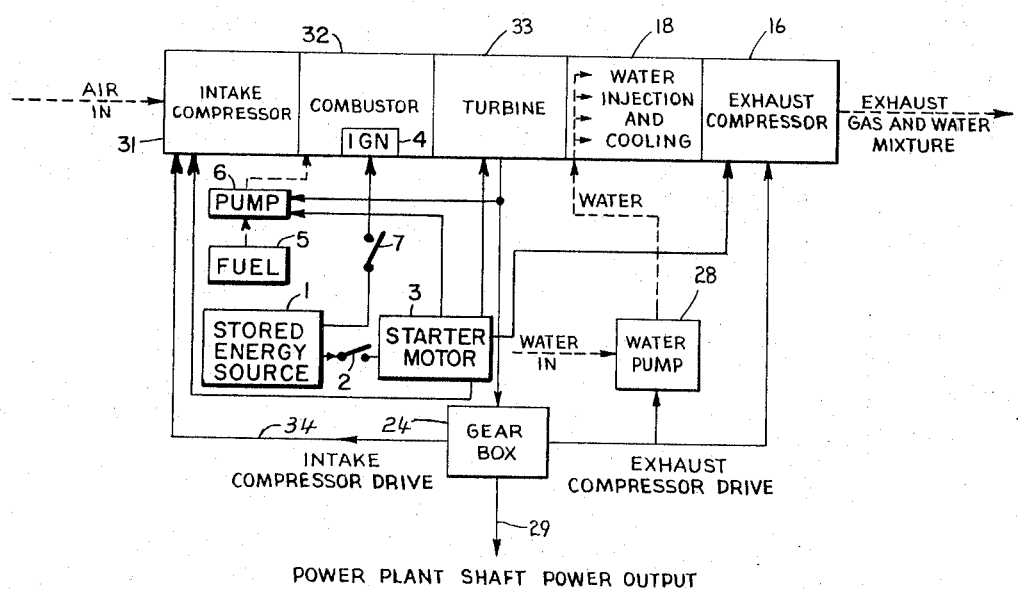
FIGURE 2 is a block diagram of an embodiment of the present invention incorporating an intake compressor.

FIGURE 2 illustrates an application of the present invention with an intake compressor 31. Because the combustor 32 is pressurized, and because the turbine 33 operates from a pressure well above atmospheric to a pressure well below atmospheric, these components are given different reference numerals from those which were identified in FIGURE 1. Of course, there was no intake compressor at all in the embodiment of FIGURE 1. In this combination of FIGURE 2, the water injection and cooling means 18 and exhaust compressor 16 as well as the water pump 28 and gear box 24 would naturally have somewhat different capacities and configurations than those in FIGURE 1, as required for the additional power developed and also to provide the shaft drive 34 for the intake compressor.

To illustrate the type of performance which can be expected from the embodiment of FIGURE 2, as compared to a conventional combination omitting the water injection and cooling and exhaust compressor, the following example will be of interest. Taking a conventional compressor having a compressor ratio of 1.5:1, and a combustor operable at 1.5 atmospheres, the performance will be calculated based on conditions representative of the northern lakes areas of the United States where a boat incorporating the power plant of FIGURE 2 might be used. Accordingly the water and air temperature will both be assumed to be 60° F. (equivalent to 520° Rankine). Rankine temperatures will be used in all calculations for this comparison. Also, using values easily attainable in conventional state of the art devices, intake compressor efficiency will be taken as 80%, turbine efficiency as 90%, and turbine inlet temperature from the combustor as 1450° F. (1910° R.).

To enable use of inexpensive materials, a low speed compressor would be used and the compressor ratio would be 1.5:1. At this ratio, the compressor temperature ratio ideally is:

$$\frac{T_2}{T_1} = \left(\frac{P_1}{P_2}\right)^{\frac{1-\alpha}{\alpha}}$$

or $$\frac{T_2}{T_1} = \left(\frac{1}{1.5}\right)^{\frac{1-1.4}{1.4}} = 1.5^{.286} = 1.123$$

(Where $\alpha$ is the ratio of specific heat at constant pressure to the specific heat at constant volume of air in the compressor temperature range, or about 1.4.)

Thus, from the above equation, we find that the compressor discharge temperature will be 584° R. The enthalpy change of air over this rise in temperature in the compressor is about 15.1 B.t.u. per pound. This is equivalent to 21.4 horsepower per pound of air flow per second. Correcting for the 80% compressor efficiency, the compressor power requirement per pound of air flow per second becomes 26.8 horsepower.

In the turbine temperature range, $\alpha$ will be about 1.33 so that from the equation $$\frac{T_2}{T_1} = \left(\frac{P_1}{P_2}\right)^{\frac{1-\alpha}{\alpha}}$$

we find that when the turbine has expanded from 1.5 atmosphere back to atmospheric pressure, the gas temperature would be 1725° R., there being a .904 temperature ratio across the turbine. An enthalpy decrease of 50.5 B.t.u. per pound of air accompanies this temperature change and a horsepower of 50.5×1.415 or 71.5 results. Again, correcting for 90% turbine efficiency, we have an actual turbine horsepower of 64.3 horsepower per pound of air per second. To obtain the net turbine output horsepower for this conventional power plant, we subtract the compressor requirement from the turbine output to obtain 37.5 horsepower net output per pound of air per second.

Now adding the water injection and cooling means 18 and exhaust compressor 16 following this combination, and thus providing the power plant of FIGURE 2, the output from the water injection and cooling means will include a mixture of air and water mist. The increased density naturally leads to an increased pressure ratio in a compressor of a given size and speed. Therefore the exhaust compressor 16 will have a pressure ratio of 2:1 and, because it discharges to atmosphere, the inlet thereto and outlet from the turbine will be at one-half atmosphere. The intake compressor power requirement will be the same as in the conventional example, namely 26.8 horsepower per pound of air flow per second and the same fuel input rate and turbine inlet temperature will be established for this example as for the conventional example.

The turbine pressure ratio is 1.5 atm. to 0.5 atm. or 3:1. $\alpha$ is still about 1.33 in this temperature range and the turbine temperature ratio will be $$_3\left(\frac{-.33}{1.33}\right) = .762$$

The drop in temperature across the turbine then ideally will be from 1910 degrees R. to 1455 degrees R. The enthalpy change of air in this temperature range is about 122.5 B.t.u. per pound. This represents an ideal horsepower per pound per second of air flow of 173. Correcting this for 90% turbine efficiency gives an actual horsepower of 156 horsepower per pound of air flow per second.

The exhaust compressor power requirement should be somewhat less than for an adiabatic process because some heat will be taken up by the water during compression of the mixture, but for simplicity the process will be calculated as adiabatic. As in the case of the intake compressor, the ideal temperature ratio is calculated according to the formula $$\frac{T_2}{T_1}\left(\frac{P_1}{P_2}\right)^{\frac{1-\alpha}{\alpha}}$$

with the 2:1 pressure ratio and will be $P_2/P_1$ $$.286 = 2.286 = 1.219$$

If we have cooled the turbine discharge to 100° F. or 560° R. the compressor discharge temperature will then ideally be 560×1.219=682° R. The enthalpy change would then be about 29 B.t.u./lb. and the ideal compressor power requirement would be 41 horsepower per pound per second of air flow. Correcting this for 80% compressor efficiency plus 13% water vapor (based on the partial pressure of water vapor in the saturated air at the exhaust compressor intake at intake pressure of ½ atmosphere and intake temperature of 560° R.) yields a power requirement of 41/.8×1.13=58 horsepower per pound of air per second.

The water flow rate requirement for this engine would ideally be about 7.5 pounds per second per pound of air flow. The pressure required would depend upon cooler gas flow velocity and degree of atomization, but 200 p.s.i.g. should be adequate. The ideal pump power requirement becomes 200×144×7.5/64 ft. lb. per second=6.15 HP. To allow for inefficiencies we shall allow 10 HP for the water pump. An additional ½ horsepower will be allowed for the work of pumping the water out of the engine.

The total requirements of compressors and water pump for the embodiment of FIGURE 2 now amount to:

| | HP/lb. air per sec. |
|---|---|
| Intake compressor | 26.8 |
| Exhaust compressor | 58 |
| Injection pumping | 10 |
| Scavenge pumping | .5 |
| Total | 95.3 |

Subtracting this from the power developed by the turbine: 156−95.3=60.7 horsepower net output of engine. Comparison of this power to that of the previously described conventional engine without exhaust cooling and exhaust compression shows a 62% power gain with no increase in fuel flow rate. Also the conventional engine would have an exhaust temperature of around 1300° F. which is a common hazard of gas turbine engines, but the engine of FIGURE 2 would have an exhaust temperature of only about 100° F. It could also be expected to be quieter because the water would dampen and absorb the sound.

In the engine of FIGURE 2 described above, the compressor discharge temperature was in the neighborhood of 700° R. while the turbine discharge was over 1450 degrees. Clearly this is a situation in which a heat exchanger (or regenerator could advantageously be used to preheat the compressor discharge air, to reduce the fuel input requirement, while simultaneously reducing the cooler heat rejection requirement.

Such an arrangement is shown in FIGURE 3 wherein the turbine is separated into two sections 36 and 37, the former being the high pressure turbine, and the latter being the low pressure turbine. A reheat combustor 38 is provided between the high pressure turbine and low pressure turbine. A heat exchanger 39, deriving heat from the outlet 41 of the low pressure turbine, heats the air compressed by intake compressor 31. This preheated air then is supplied from the heat exchanger 39 through the conduit 42 to the combustor 32. The higher temperature of combustion products out of the low pressure turbine which would result from the use of the reheat combustor 38, would make the heat exchanger 39 more feasible economically than it might otherwise be. This combination of FIGURE 3 could be highly desirable for stationary or marine use.

It can be recognized that, if desired, a heat exchanger can be provided between the turbine and water injecting and cooling stages of the embodiment of FIGURE 1, with the air into the combustor first passing through the heat exchanger in a manner similar to that shown in FIGURE 3, but without the use of an intake compressor.

Referring now to FIGURE 4, it is recognized that because the present invention can employ external combustion, the temperature of the gas source may exceed the desired turbine inlet temperature. Therefore, a precooling section 43 is provided between the hot gas source 44 and the turbine 13. In the precooling section, water is injected by the water pump 28 to cool the inlet gases to the turbine down to the proper temperature. The vaporized water generated in the cooling process would add to the turbine flow volume, but would make little difference in the exhaust compressor work required, because most of the added vapor would condense in the mixing stage. Such a precooling type of application might be employed in the previously described configurations for emergency power situations where the fuel flow might be increased.

Because of the high mass flow of the external combustion gas turbine with water injection according to the present invention, considerable thrust at the exhaust compressor outlet could be expected, particularly if the outlet configuration were such as to provide a jet, or if a jet nozzle were attached to the exhaust compressor outlet.

The water injection and cooling and exhaust compression could be combined into a single stage of water jet compression, if desired, for exhaust cooling and silencing the minimal expense and complexity. Where the engine is going to be used in a jet boat, it will naturally be pumping water. The water can be pumped into the jet compressor stage rather than directly out of the boat, with an improvement of overall efficiency over that which would be obtained with a conventional gas turbine powering a water jet external to the engine. This combination would then be very desirable for employment in jet propelled boats.

It is important that where water injection is used for cooling between the turbine and the exhaust compressor of the present invention, the mixing of the water and exhaust gases be accomplished in the presence of turbulence and a high level of sound such that the mixture entering the exhaust compressor be largely homogeneous mass having intimate thermal and physical contact between the gas and water particles so that the water and gases have essentially the same temperatures and velocities.

An example of a power output calculation for the embodiment of FIGURE 1 may be helpful and will be included at this point. The calculations will be based upon a turbine input of 1 lb. per second of air at atmospheric pressure and 1241° F. The calculations are therefore based on this air flow rate and inlet temperature in addition to other exemplary values as follows:

Inlet temperature _____ 1700° R. (1241° F.).
Inlet pressure _____ 2120 lb./sq. ft or 1 atm.
Pressure ratio (turbine) _____ 3:1.
Air flow rate _____ 1 lb. per sec.
Cooling water flow rate _____ 10 lbs. per sec.
Air $\alpha = C_p/C_y$ in turbine temperature _____ 540° R. or 81° F.
Air $\alpha = C_p/C_y$ in turbine temperature range _____ 1.35.
Air in compressor temperature range _____ 1.40.
Air $C_p$ in cooling and exhaust temperature range _____ .25 B.t.u./lb. Degree.

Adiabatic expansion of the incoming hot air through the turbine from one atmosphere pressure and 1700° R. would ideally produce a turbine discharge temperature of:

(1) $$T_2 = T_1\left(\frac{P_1}{P_2}\right)^{\frac{1-\alpha}{\alpha}} = 1700 \times 3^{\frac{1-1.35}{1.35}} = 1278 \text{ Degrees R.}$$

From air enthalpy tables the change in enthalpy of one pound of air over this temperature range is approximately 110 B.t.u. The turbine horsepower is therefore about:

110 B.t.u./sec.×778 ft. lb./B.t.u.×1 HP sec./550 ft. lb.=155 HP

To avoid back pressure against the turbine discharge gases, the cooling water should be injected with a rearward velocity component equal to that of the turbine discharge. In order that the water may be diffused through the flowing gas, some lateral component of velocity will be necessary so that a spray will be effected. If a 30° included angle of spray (15° each way from gas flow direction) is allowed in pump power calculations, the required spray velocity will be increased by the factor 1.0353 (secant 15°).

Because of cooling and compression of gases between the point of water injection and the point of exhaust discharge, the discharge velocity will be much lower than the water injection velocity so that part of the pump power will be recovered in impact pressure rise of the mixture as it is slowed. This power recovered will reduce the compressor shaft power requirement thus increasing the net output power of the engine. Because the calculations herein are not intended to represent exact performance characteristics, no attempt will be made to estimate the amount of pump power recoverable in this manner and the following calculations will assume the pump power to be totally lost.

For the purpose of calculating the water injection pump power requirements, a turbine discharge velocity of 150 feet per second will be assumed. Delivery of 10 pounds of water per second at a velocity of 150 feet per second×1.0353 spray angle correction factor would require a pressure (P) of:

(2) $$P = \frac{1}{2}\rho V^2$$

where $\rho$ is the density of water (about 2 slugs per cubic ft. and V is the velocity of the water.

$$P = \tfrac{1}{2} \times 2 \text{ slugs/ft.}^3 \times 150^2 \text{ ft.}^2/\text{sec.}^2 \times 1.0353^2$$
$$= 24{,}300 \text{ lb./ft.}^2$$

However, because the water will be injected into gases at a pressure well below atmospheric pressure, the water pumping requirement is reduced by an amount which will approximate ⅔ of atmospheric pressure, or about 1413 pounds per square foot. Therefore, the working pressure of the pump then becomes:

$$24{,}300 - 1{,}413 = 22{,}887 \text{ lbs. per sq. ft.}$$

and the pump power required is:

(3) 22,887 lb./ft.$^2 \times$ 10/64 ft.$^3$/sec. $\times$ HP/550 ft. lb./sec. = 6.5 HP In the water mixing process the temperature resulting when the turbine discharge gas is mixed with the injected water is obtained by dividing the total heat input rate by the total heat capacity rate (if the cooling effect of water vaporization is ignored). The total input rate is:

(4) (1 lb. air $\times 1278° \times .25$ B.t.u./deg.)
plus (10 lb. water $\times 540°) = 5720$ B.t.u./sec.

The total heat capacity rate is:

(5) 1 lb. air $\times .25$ B.t.u./lb. deg. plus 10 lb. water $\times 1$ B.t.u./lb. deg. $= 10.25$ B.t.u./degree and the resultant exhaust compressor inlet temperature (T) is:

(6) $T = 5720/10.25 = 558$ degrees R.

For simplification of calculations, it will be assumed that the amount of water vaporized in the mixing process will be equal to that condensed in the mixture during compression and exhaust to atmosphere. This condition of no net vaporization may reasonably be expected to occur at some ambient and fuel input conditions. This does not mean, however, that engine operation is dependent on this equality.

The exhaust compression power requirement will be calculated as that of a purely adiabatic process of compressing one pound of air per second to atmospheric pressure and corrected by an appropriate factor to include the added water vapor as if there were no condensation or heat transfer to the water during compression. Ideally condensation and heat transfer should reduce this power requirement significantly.

Because of atmospheric humidity and water product of combustion, a water content of 8% by volume of the turbine discharge seems reasonable. At the mixture temperature of 558 degrees R. and one third atmosphere, the partial pressure of water is about 19% of the total. About 14% of the turbine discharge flow must be added in the form of water vapor in order that the vapor volume be 19% of the total flow volume. Thus, the exhaust compressor inlet volume will be increased 14% and 1.14 will be used as a correction factor to approximate the added compressor power requirement. The exhaust compressor power requirement approximation follows:

$$T_2 = T_1 \left(\frac{P_1}{P_2}\right)^{\frac{1-\alpha}{\alpha}} = 558 \left(\frac{1}{3}\right)^{\frac{-.4}{1.4}} = 764°R.$$

Where $T_2$ and $P_2$ are at the exhaust compressor outlet and $T_1$ and $P_1$ are at the exhaust compressor inlet.

Enthalpy increase per pound of air over this temperature is about 51 B.t.u. and this multiplied by $$\frac{778 \text{ B.t.u. sec. HP}}{550 \text{ sec. ft. lb.}} \text{ equals } 71.5 \text{ HP sec.}$$

equals 71.5 HP sec.

Corrected approximately for added water vapor, this becomes $71.5 \times 1.14 = 8.15$ HP sec. per lb. air flow.

Exhausting the .16 cubic ft./sec. of liquid water requires .16 ft.$^3 \times (2120 - 705)$ lb./ft.$^2$ per sec. equals about ½ horsepower (HP). Thus, the exhaust compressor power requirement is 82 horsepower.

Engine output power now becomes:

155 turbine HP $-$ 6.5 pump HP $-$ 82 exhaust compressor HP $= 66.5$ HP per lb. of 1241° air The exhaust mixture temperature calculation (assuming a saturated mixture):

1 lb./sec. $\times 7.64 \times .25$ B.t.u./degree 10 lb./sec. $\times 558° \times 1 = 5771$ B.t.u./sec.

$$\frac{5771 \text{ B.t.u/sec.}}{10.25 \text{ B.t.u/sec. degree}} = 536 \text{ degrees R.}$$

At 563 degrees R. in a saturated mixture, the water vapor volume accounts for about 8% of the total gaseous volume. This is equal to the vapor ratio at the turbine. Therefore, in this case there has been no net water vaporization within the engine.

It can be seen that if cooling water input is increased as the turbine inlet temperature is increased, the exhaust compressor power requirement will vary only slightly. Since the cooling water pump requirement is relatively small, the engine power can be increased considerably by increasing the inlet temperature.

Efficiency and power can be increased by reducing the internal pressure. Calculations indicate that around 200 HP per lb. of air flow can be achieved with average water temperature and a pressure ratio of six to one (with turbine inlet temperature around 1750° F.).

It is believed that a power plant operating according to the present invention would be well adapted to achieve the economies and other objects set forth herein, as well as affording other advantages not specifically mentioned.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A power plant comprising:
   a source of hot gases;
   a gas turbine having inlet means coupled to said source and receiving hot gases therefrom, said turbine having outlet means discharging hot gases;
   means having an inlet coupled to said turbine outlet means and discharging liquid into gases discharged from said turbine outlet means for cooling of said discharged gases, said means continuously compressing and exhausting to atmosphere a mixture of the discharge liquid and the cooled gases discharged from said turbine outlet means, thereby maintaining at less than atmospheric pressure the pressure in said hot gases where discharged from said turbine, said means discharging liquid being disposed to discharge cold water directly into mixture with said hot gases as discharged from said turbine, thereby effecting heat transfers from said gases to said water by direct contact therewith to cool said gases, said means discharging liquid being spray jets oriented to provide a high velocity water spray primary component in the direction of turbine discharge, and to provide a lateral component of velocity for mixing, a portion of the kinetic energy of said turbine discharge and water primary component being converted into pressure rise of the mixture.

2. The plant of claim 1 wherein:
the velocity of said primary velocity component substantially equals the velocity of turbine discharge.

References Cited

UNITED STATES PATENTS

| | | | |
|---|---|---|---|
| 1,462,470 | 7/1923 | Adamson | 60—39.5 |
| 2,115,338 | 4/1938 | Lysholm | 60—39.05 X |
| 2,472,846 | 6/1949 | Nettel et al. | 60—39.18 X |
| 2,623,356 | 12/1952 | Coanda | 60—39.5 |
| 2,660,032 | 11/1953 | Rosenthal | 60—39.55 X |
| 2,786,626 | 3/1957 | Redcay | 230—209 |
| 3,054,257 | 9/1962 | Schelp | 60—39.51 X |

FOREIGN PATENTS

| | | |
|---|---|---|
| 191,739 | 5/1904 | Germany. |
| 704,669 | 2/1954 | Great Britain. |
| 323,707 | 8/1957 | Switzerland. |

CARLTON R. CROYLE, *Primary Examiner.*

PO-1050
(5/69)

UNITED STATES PATENT OFFICE
CERTIFICATE OF CORRECTION

Patent No. 3,369,361      Dated February 20, 1968

Inventor(s) Gale M. Craig

It is certified that error appears in the above-identified patent and that said Letters Patent are hereby corrected as shown below:

Column 5, line 66, the first "the" should be --with--.

Column 6, line 22, delete "Air a=Cp/Cy in turbine temperature" and insert --Cooling water source temperature--.

Column 8, line 2, "8.15" should be --81.5--.

Column 8, line 18, "536" should be --563--.

(SEAL)
Attest:

Edward M. Fletcher, Jr.
Attesting Officer

WILLIAM E. SCHUYLER, JR.
Commissioner of Patents